US007667875B2

(12) United States Patent
Liu

(10) Patent No.: US 7,667,875 B2
(45) Date of Patent: Feb. 23, 2010

(54) TEXTURED HT SCREENS FOR IMPROVED UNIFORMITY APPEARANCE

(75) Inventor: Chu-heng Liu, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 602 days.

(21) Appl. No.: 11/450,539

(22) Filed: Jun. 9, 2006

(65) Prior Publication Data

US 2007/0285727 A1 Dec. 13, 2007

(51) Int. Cl.
*H04N 1/405* (2006.01)
(52) U.S. Cl. ............... 358/3.06; 358/3.12; 358/3.14
(58) Field of Classification Search ........... 358/1.9, 358/2.1, 3.1–3.12, 3.13–3.14, 3.22, 3.26, 358/3.03–3.06; 382/237
See application file for complete search history.

(56) References Cited

U.S. PATENT DOCUMENTS

| 4,245,258 | A | 1/1981 | Holladay |
| 6,798,537 | B1 * | 9/2004 | Lau et al. ............... 358/1.9 |
| 7,151,619 | B2 * | 12/2006 | Toyoda et al. ............ 358/3.13 |
| 2006/0044617 | A1 | 3/2006 | Wang et al. ............. 358/3.06 |

FOREIGN PATENT DOCUMENTS

| EP | 0808056 A2 | 11/1997 |
| WO | WO91/02426 | 2/1991 |

OTHER PUBLICATIONS

European search report—Date of Mailing: Nov. 28, 2008.

* cited by examiner

*Primary Examiner*—Thomas D Lee
*Assistant Examiner*—Stephen M Brinich
(74) *Attorney, Agent, or Firm*—Luis M. Ortiz; Kermit D. Lopez; Tuesday A. Kaasch

(57) ABSTRACT

An image processing method for adding noise-like texture to the print through the manipulation of halftone screens. The method injects noise into halftone thresholds arrays rather than directly into the image. The method operates by creating a halftone threshold array of suitable size to support the desired noise characteristics. A textured pattern of a corresponding size is created having the desired noise characteristics and boundary transitions. The texture pattern is applied to the halftone threshold array by an amount determined by a noise amplitude control curve. The incoming contone image is then processed with the modified halftone screen.

7 Claims, 8 Drawing Sheets

TEXTURED HT SCREENS FOR IMPROVED UNIFORMITY APPEARANCE

TECHNICAL FIELD

Embodiments are generally related to image processing. Embodiments are also related to the field of digital image data printing. Embodiments are additionally related to the manipulation of the halftone screens in which noise-like texture is added to the print.

BACKGROUND OF THE INVENTION

Many processes and devices have been used in image processing for digital printing. The acceptance of electrostatic print engines by the graphic arts and commercial print market has heretofore been hampered by various problems, including the lack of acceptable uniformity appearance, especially in the mid-tone range. In the image forming apparatus of the electro photo-graphic system, an apparatus capable of outputting a color image by arrangement of a plurality of image forming units corresponding to color components, color-decomposed in accordance with subtractive primaries or repetition of an image forming process, has previously been put to practical use.

Image noise is among one of the top image quality issues for electrostatic printing when compared to offset printing. Noises at high and low spatial frequencies are typically referred to as graininess and mottle within the visual frequency range. The image noises at various spatial frequencies, namely graininess & mottle, are of particular interests to this application. In particular, the relative amplitudes of the image noises at different frequencies are adjusted to optimize the visual uniformity of a print.

Ideally, it is desired to eliminate the image noise at all frequencies. But current electrostatic printing technology still leaves a significant amount of noises at various frequencies, which leads to quite objectionable graininess and mottle (blotchy) appearance.

Visual masking is a well known phenomenon that some visual effects are less noticeable in the presence of some other more visually dominant features. Some image processing methods are taking advantages of this phenomenon by using noises to mask out moiré, banding and contouring. Another particular example is the visual masking of mottle by graininess: image mottle (low frequency variation) perception improves as the image graininess increases. Therefore, there is an opportunity to optimize the overall uniformity (combining both mottle & graininess) by adjusting the levels of noises at different frequencies. Although it is difficult to lower the system noise, it is possible to increase the noise levels at pre-selected frequencies to achieve the desired visual optimization.

Image mottle is particularly troublesome for some systems. Following the visual masking principle, adding noise to the image, especially high frequency noises, such as graininess noise, have shown to improve the mottle appearance of the image. Due to the random nature of noise, noise addition to the print has only been demonstrated through manipulation of the input contone images before halftoning.

Although the addition of noise to images has show improvement in mottle appearance, such methods are still inadequate. What is needed are better and more flexible methods to improve uniformity appearance of images.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for improved image processing by providing a noise-like texture to halftone screens to enhance printed image appearance.

It is another aspect of the present invention to improve the uniformity appearance of printed images by manipulating halftone screens wherein a noise-like pattern is generated for application to a printable image, modify an original halftone screen by applying the noisy pattern to it and printing the printable image including the modified halftone screen. The noisy pattern includes a texture that will enhance image print appearance and an ability to tile without the introduction of visible artifacts.

The aforementioned aspects and other objectives and advantages can now be achieved as described herein. Noise-like texture can be added to a document print through the manipulation of the halftone screens. First, a noise like pattern is generated. This pattern is produced to the must have the optimal texture to enhance the print appearance and is able to tile without introducing any visible artifacts. This noise-like pattern and an amplitude control function for the noise are then used to modify a regular halftone screen. This modified screen will be similar to the original screen in terms of screen angle and dot shape, but the dot size is modulated by the texture pattern. An image when rendered with this textured screen will show the noise-like pattern that was embedded during the screen modification step. Compared to true noise, which is random in space & time, a noise-like texture pattern reduces the implementation challenge and allows the noise addition through halftone screens.

Accordingly, a halftone screen can be modified by a textured-pattern. Images rendered by this textured screen can superimpose the texture pattern onto the original image. When this textured pattern is optimized in both spatial geometry and amplitude, the output print will have improved IQ appearance.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
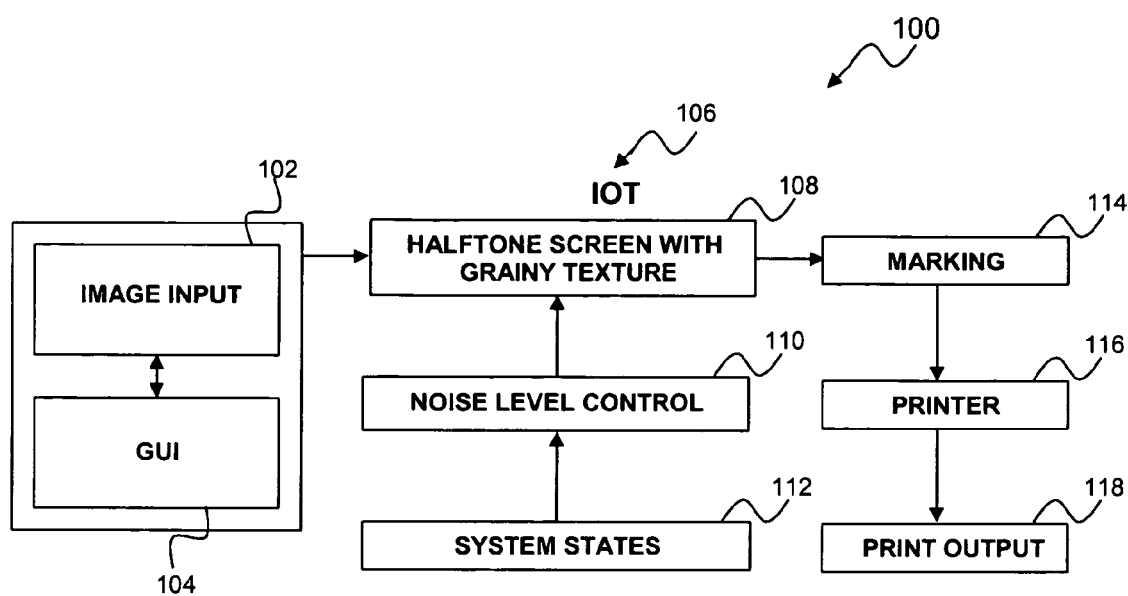
FIG. 1 illustrates a block diagram of a system that shows the implementation for textured HT screens for improved uniformity appearance in which a preferred embodiment can be implemented.

Referring to FIG. 1, illustrated is a block diagram of the system 100 that shows the implementation of textured HT screens for improved uniformity appearance in which a preferred embodiment can be implemented. The input image 102 is interfaced via the graphical user interface (GUI) 104 and sends to the halftone (HT) screen with grainy texture 108 that is present in the input-output terminal (IOT) 106. The halftone screen with grainy texture is configured with the marking 114. A quick way to generate a halftone screen with a noise level control 110 is required. The noise amplitude can be adjusted easily without the base halftone redesign and has very little system interactions, e.g., such as with tone-reproduction curves (TRCs), color look up table (LUT) etc. This screen level noise change can be applied through a machine IQ adjustment cycle since many printing systems have already implemented some IQ related actuator changes in response to the system state 112 changes for forming the print output 118 by using the printer 116 that forms the digital production press.

Figure 2:
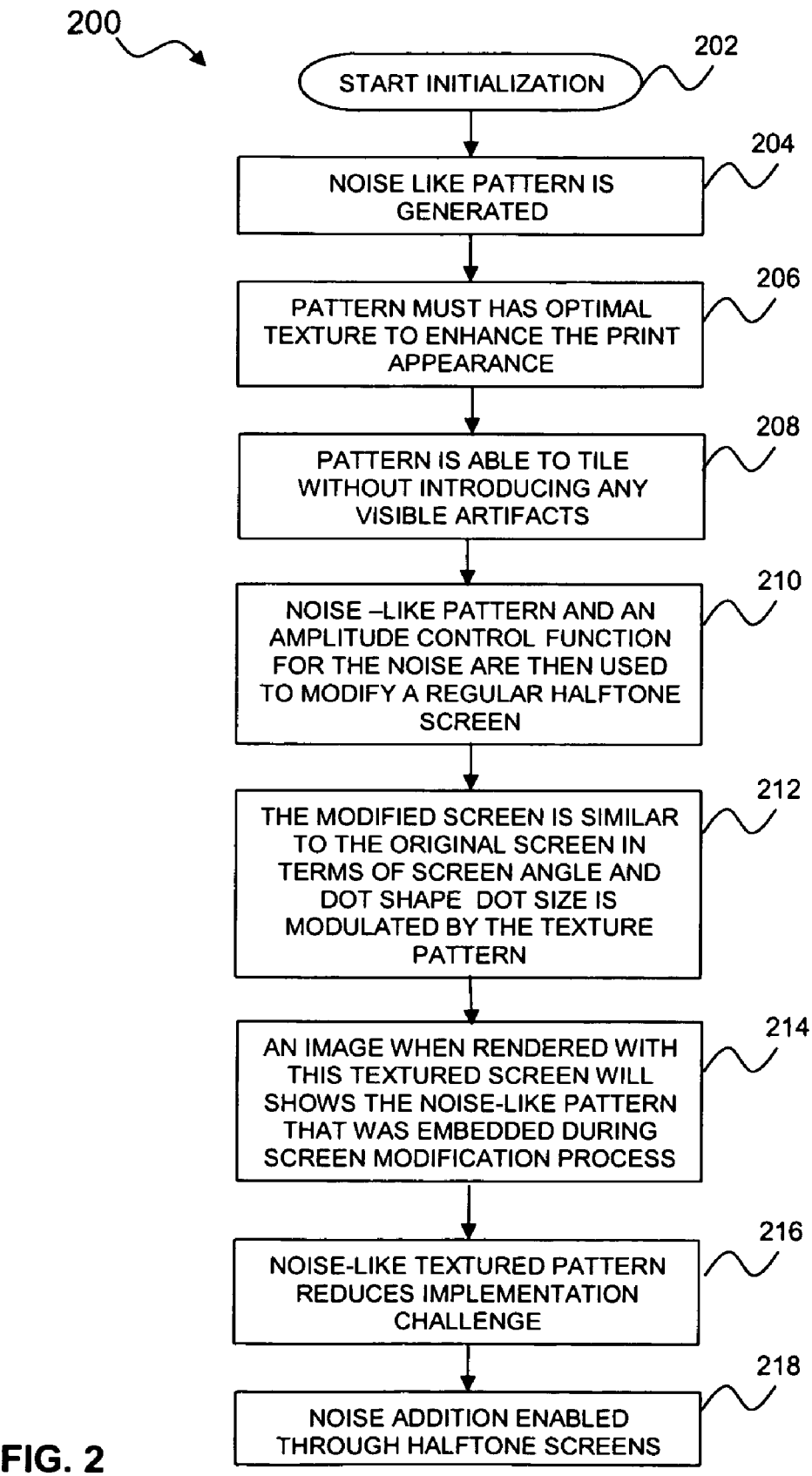
FIG. 2 illustrates a high-level flowchart of the work flow in textured ht screens for improved uniformity appearance in accordance with a preferred embodiment.

Referring to FIG. 2, illustrated is a high-level flow chart 200 of the work flow in textured HT screens for improved uniformity appearance in which a preferred embodiment can be implemented. As depicted at block 202, initialization occurs. Next, as indicated at block 204 noise-like texture is added to the print through the manipulation of the halftone screens. First, a noise like pattern is generated. This pattern has optimal texture to enhance the print appearance as described in block 206. Therefore, the pattern is able to tile without introducing any visible artifacts as indicated in block 208. Therefore as described in block 210, this noise-like pattern and an amplitude control function for the noise can then be used to modify a regular halftone screen. This modified screen will be similar to the original screen in terms of screen angle and dot shape but the dot size is modulated by the texture pattern as indicated in block 212. An image when rendered with this textured screen will shows the noise-like pattern that was embedded during the screen modification step as described in block 214. Next as indicated in block 216, a noise-like texture pattern reduces implementation challenge and thereafter as indicated in block 218 noise addition is enabled through halftone screens.

Figure 3:
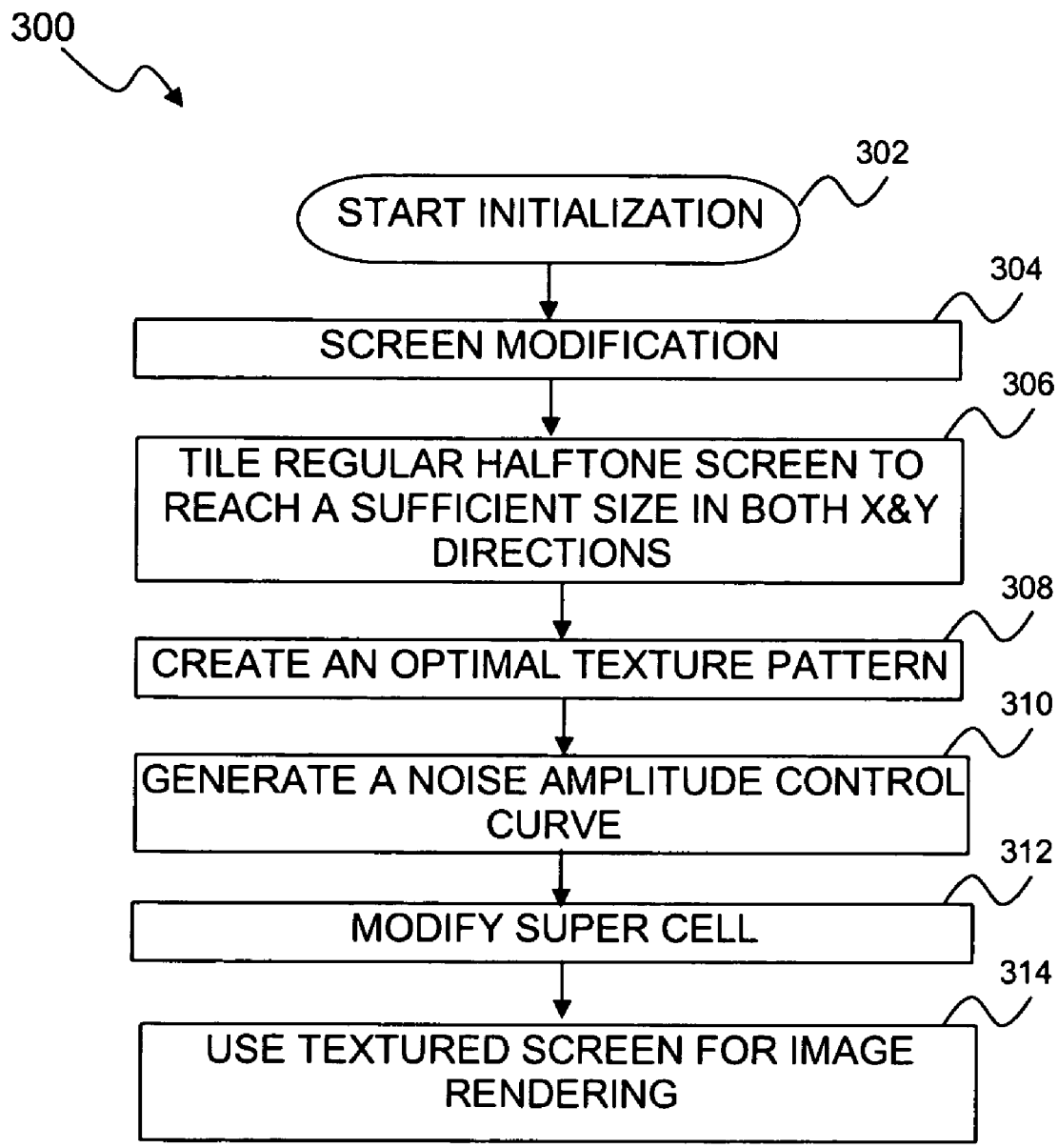
FIG. 3 illustrates a high-level flowchart of the detailed process involved in textured HT screens for improved uniformity appearance in accordance with a preferred embodiment.

Referring to FIG. 3, a high level flow chart 300 of showing the detailed process involved in textured HT screens for improved uniformity appearance in accordance with a preferred embodiment. As depicted at block 302, initialization occurs. Next as indicated in block 304, screen modification follows and as indicated in block 306 tiling regular halftone screen to reach a sufficient size in both X & Y directions. The minimal size will be defined in step where the texture pattern is created and optimized, which will be described in detail in FIG. 4. Depends on the nature of the screen (screen angle and frequency), cells can be tiled in other directions. The resulting super tile must be able to tessellate. For super cell halftone screens, the size of the super cell might be sufficient and no tiling is required. Thereafter as depicted in block 308 creating an optimal texture pattern, a grainy noise pattern is generated by image processing. Thereafter as depicted at block 310 by the generation of a noise amplitude control curve to optimize the uniformity appearance. To avoid clipping at the low and high density ends, noise amplitudes are reduced to zero. Next as described in block 312 modifying the super cell by using the spatial pattern and amplitude to modify the threshold values of the super cell. The resulting textured screen is then used for image rendering as indicated in block 314.

Figure 4:
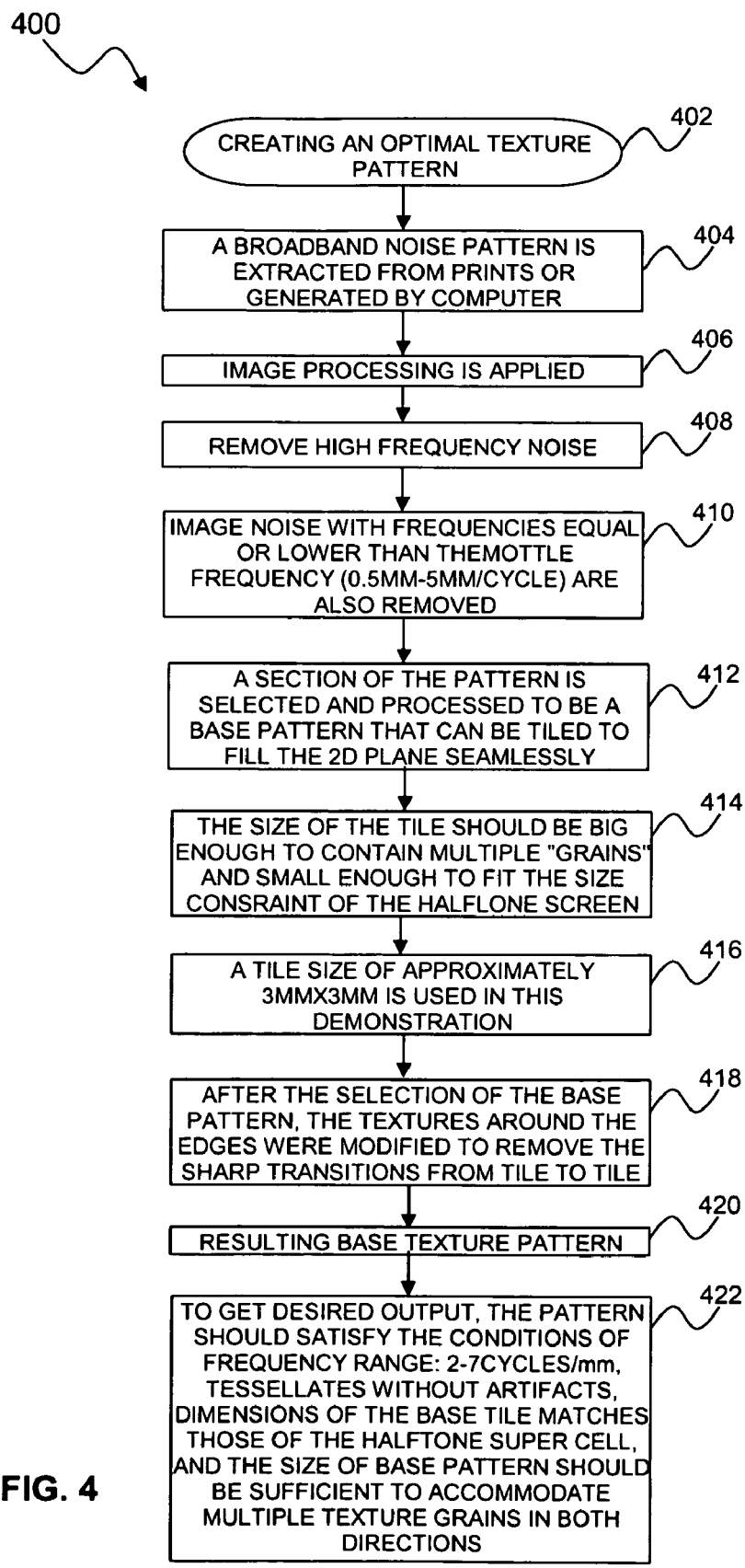
FIG. 4 illustrates a high-level flowchart of the detailed process involved in the creation of an optimal texture pattern in textured HT screens for improved uniformity appearance in accordance with a preferred embodiment.

Referring to FIG. 4, a high level flow chart 400 of showing the detailed process involved in creating an optimal texture pattern in textured HT screens for improved uniformity appearance in accordance with a preferred embodiment. As depicted at block 402, creating an optimal texture pattern initialization occurs. Next as depicted in block 404 a broadband noise pattern is extracted from prints or generated by computer and image processing is applied as indicated in block 406 to remove high frequency noise as depicted in block 408. High frequency noise can cause unexpected aliasing noise when mixed with the halftone screen. Furthermore, high frequency pattern can cause the fragmentation of the halftone dots which is not a desirable outcome from the stand point of dot robustness. In general, frequency higher than the halftone frequency should be removed from the pattern. Thereafter as indicated in block 410 image noise with frequencies equal or lower than the mottle frequency (0.5 mm-5 mm cycle) is also removed. After the band pass filtration i.e. low pass in and high pass, the remaining texture has frequencies range roughly from 2 cycle/mm to 7 cycle/mm. Next as described in block 412 a section of the pattern is selected and processed to be a base pattern that can be tiled to fill the 2D plane seamlessly.

The following processing of the operation depicted at block 414, wherein the size of the tile should be big enough to contain multiple "grains" and small enough to fit the size constraint of the halftone screen due to memory size limitations of the printing system. For some systems, the size limit is roughly 3.5 mm×3.5 mm, which is sufficient. A tile size of approximately 3 mm×3 mm can be used in this demonstration as indicated in block 416. After the selection of the base pattern, the textures around the edges were modified to remove the sharp transitions from tile to tile as described in block 418. Next as indicated in block 420 the resulting base texture pattern is obtained. The texture pattern can be created in many ways so that to get the desired output, the pattern should satisfy the following conditions of frequency range: 2-7 cycles/mm tessellates without artifacts, dimensions of the base tile matches those of the halftone super cell and the size of the base pattern should be sufficient to accommodate multiple texture grains in both directions as described in block 422.

Figure 5A:
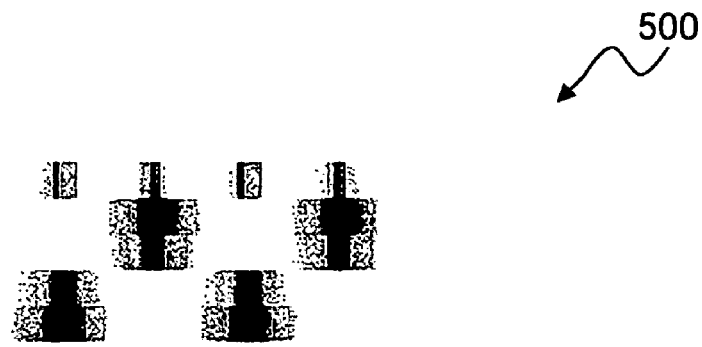
FIGS. 5A-5B illustrates a base HT screen upon which a texture pattern will be superimposed for improved uniformity appearance in accordance with a preferred embodiment.
Figure 5B:
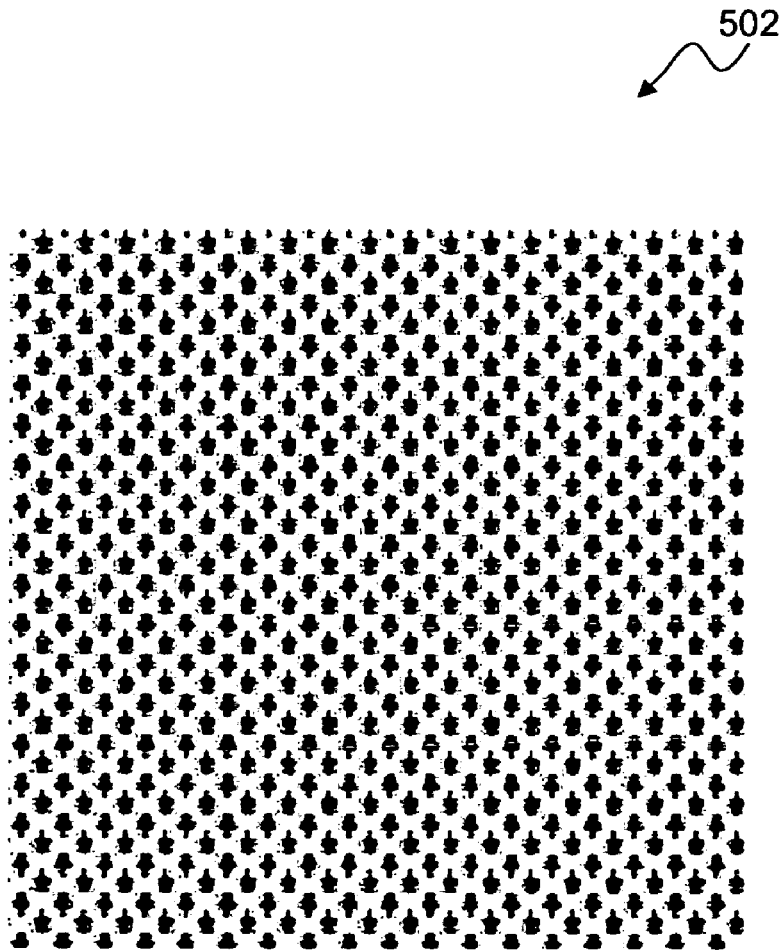

Referring to FIGS. 5A-5B illustrates the unmodified halftone cell and super cell 500, 502 upon which a texture pattern will be superimposed for improved uniformity appearance in accordance with a preferred embodiment. It illustrates that the base halftone cell 500 is used to tile in both X & Y directions to form a super tile/cell 502, which has a size of approximately 3 mm×3 mm.

Figure 6A:
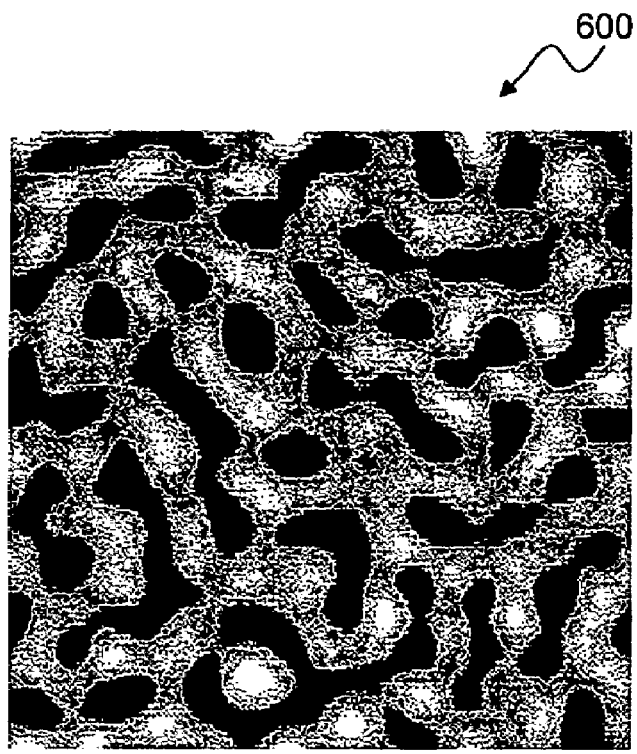
FIGS. 6A-6B illustrates spatial pattern in textured HT screens for improved uniformity appearance in accordance with a preferred embodiment.
Figure 6B:
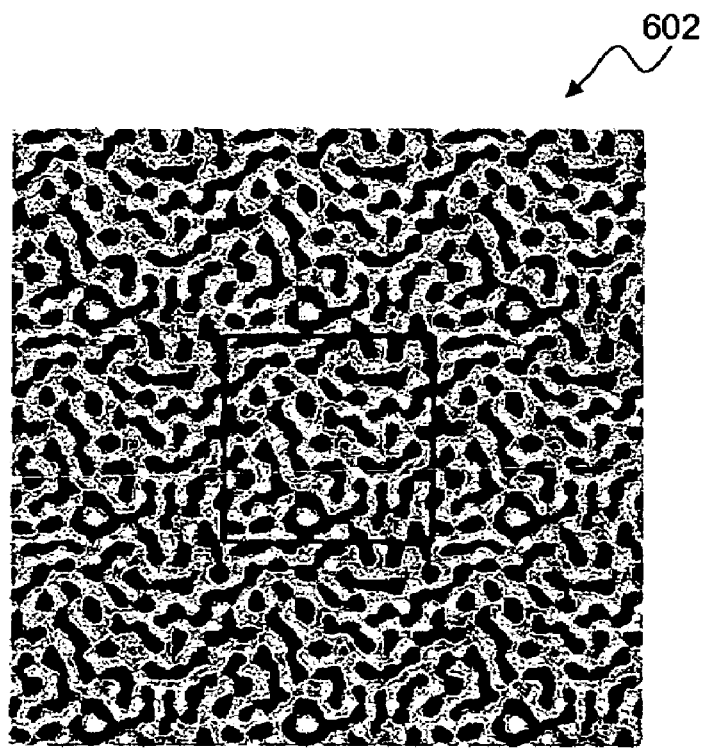

Referring to FIGS. 6A-6B, illustrated are grainy patterns 600, 602 in textured HT screens for achieving improved uniformity appearance in accordance with a preferred embodiment. The base tile 600 can be repeated in X & Y directions to tile the whole 2D plane with a seamless grainy pattern 602.

Figure 7:
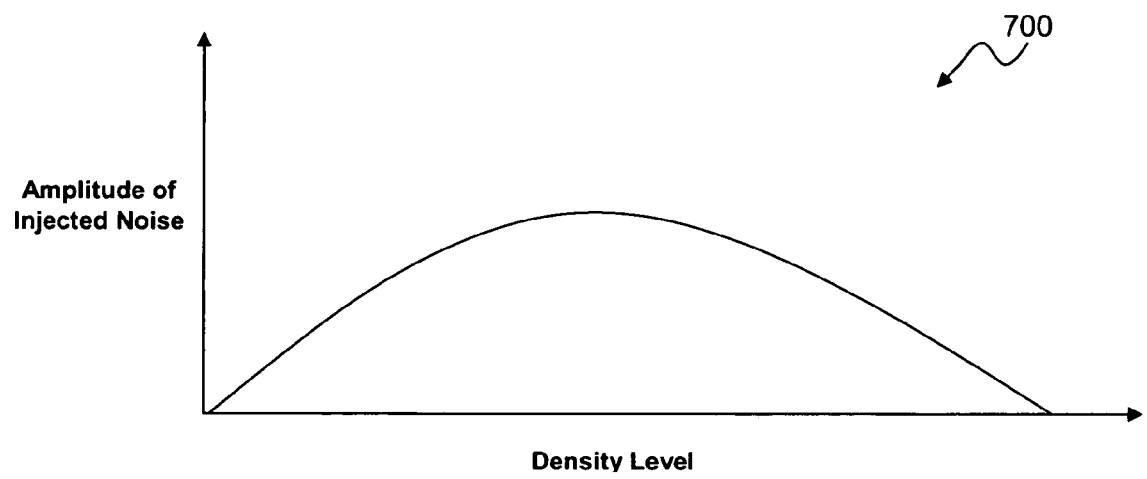
FIG. 7 illustrates the graphical representation of a noise amplitude control curve in textured HT screens for improved uniformity appearance in accordance with a preferred embodiment.

Referring to FIG. 7, illustrated is a graphical representation of a noise amplitude control curve in textured HT screens for improved uniformity appearance in accordance with a preferred embodiment. To avoid clipping at the low & high density ends, noise amplitudes are reduced to zero. The amplitude is maximized in the midtone, where the mottle is severe and needs the greatest amount of texture.

Figure 8:
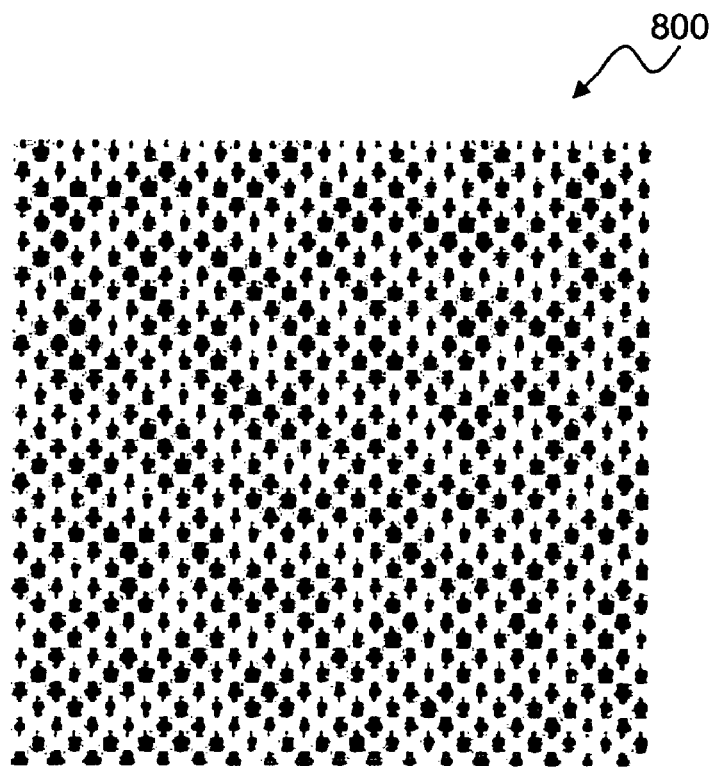
FIG. 8 illustrates a modified screen by using the spatial pattern and by generating the noise amplitude control curve in textured HT screens for improved uniformity appearance in accordance with a preferred embodiment. The gray level of each pixel represents the halftone threshold value of that pixel.

Referring to FIG. 8, illustrated is a modified screen 800. By using the spatial pattern as illustrated in FIG. 6, and by generating the noise amplitude control curve in textured HT screens, improved uniformity appearance can be achieved in accordance with a preferred embodiment. The modified screen is formed by modifying the super cell created by tiling the regular halftone screen to reach a sufficient size in both X & Y directions. The spatial pattern and amplitude control curve are used to modify the threshold values of the super cell and the pixel values. FIG. 8 is representative of the modified threshold values with exaggerated texture amplitude.

There are many ways to apply the noise pattern to the halftone screen. Illustrated is a rather straightforward addition/subtraction algorithm. The HT super cell 502 as illustrated in FIG. 5B has identical size as the texture pattern 602 shown in FIG. 6B. Denoting the threshold values of the original and modified HT supercell as $T_{ij}$ & $T'_{ij}$ and the texture pattern image as $P_{ij}$. Both $T_{ij}$ and $P_{ij}$ take values from 0 to 255. As shown in FIG. 7, A(T) is further denoted as the amplitude control curve, which takes a threshold input with values range from 0 to 255. Assuming the noise pattern $P_{ij}$ is symmetrically distributed around 128, the screen modification process can then be described mathematically by the following formula:

$$T'_{ij}=T_{ij}+A(T_{ij})*(P_{ij}-128)$$

With proper choice of the noise amplitude control curve A(T), the values of the new threshold array $T'_{ij}$ can remain between 0 and 255, namely no clipping. The magnitude of A(T) at the mid-tone range should be optimized according to the need of noise injection.

Figure 9:
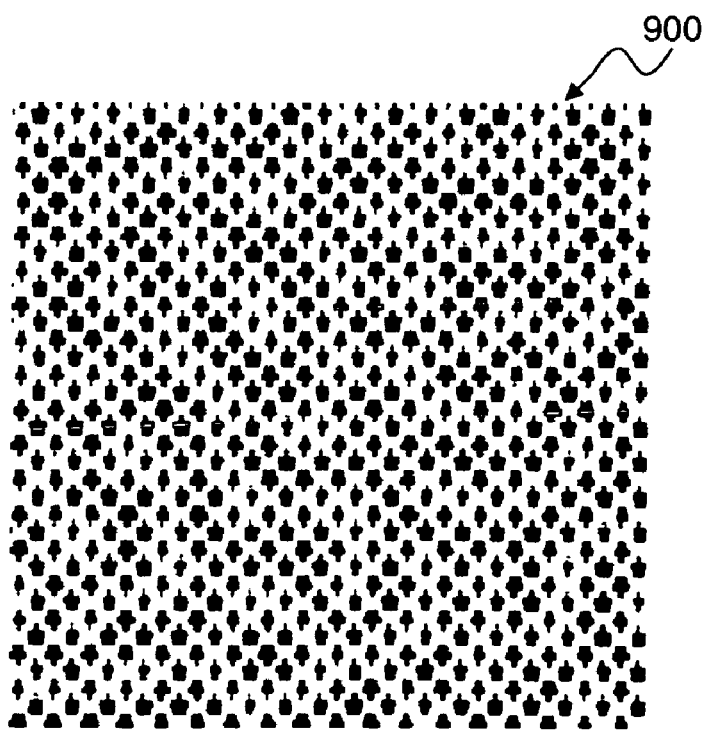
FIG. 9 shows the binary output of a midtone density level after screening with the textured screen for improving uniformity appearance in accordance with a preferred embodiment.

Referring FIG. 9, illustrated is the binary output 900 of a midtone density level after screening it with the textured screen to therefore improve uniformity appearance. The texture pattern is reproduced in the halftone output.

The concept of the tile, which is a common periodic base for both the texture pattern and the halftone cell, is an important aspect of implementation. In the illustration, the tile is a unit base for the texture pattern but a super tile for the halftone cells. When a super cell is used, the tile can be a unit base for both the texture pattern and the halftone. Following the proposed design steps, texture patterns within a certain frequency range can be faithfully reproduced by the printer and be injected onto the final print. This capability has demonstrated with many printing system configurations. Prints have been produced by digital printing through texture injection into the halftone screens. The nature of the texture pattern and the amplitude of this pattern are both critical to the final print appearance. Optimizations of the pattern & amplitude are beyond the scope of this proposal and will be covered in future.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method improving uniformity appearance of printed images by manipulating halftone screens, comprising:
   generating a noise-like pattern for application to a printable image, the noise-like pattern including a texture that will enhance image print appearance and an ability to tile without the introduction of visible artifacts;
   modifying an original halftone screen by applying the noise-like pattern to it, wherein modification of the original halftone screen is carried out using an amplitude control function during application of the noise-like pattern to the original halftone screen; and
   printing the printable image including the modified halftone screen wherein the modified halftone screen appears similar to the original halftone screen in terms of screen angle and dot shape, but the dot size of the original halftone screen is modulated by the noise-like pattern.

2. A method improving uniformity appearance of printed images by manipulating halftone screens, comprising:
   generating a noise-like pattern for application to a printable image, the noise-like pattern having an optimal texture to enhance image print appearance and an ability to tile without the introduction of visible artifacts;
   using an amplitude control function to apply the noise-like pattern to an original halftone screen thereby modifying it, wherein the modified halftone screen will appear similar to the original halftone screen in terms of screen angle and dot shape, but the dot size being modulated by the texture pattern;
   printing the printable image including the modified halftone screen.

3. A method of using textured HT screens for improving uniformity appearance in image processing, comprising:
   using regular halftone screen for tiling;
   forming a super cell;
   creating a textured pattern;
   generating a noise amplitude control curve;
   modifying the super cell using an amplitude control function; and
   using textured screen for image rendering.

4. A method of claim 3, wherein noise-like texture is added to a rendered image print through the manipulation of the said halftone screens.

5. A method of claim 3, wherein a noise-like pattern is generated with optimal texture to enhance the print appearance by the said tiling of the said regular halftone screen to reach a sufficient size to fill said textured screen in both horizontal and vertical directions.

6. A method of claim 3, wherein the cells are added in horizontal and vertical directions for tiling and the said cells are tiled in other directions depending on the nature of the screen.

7. A method of claim 3, wherein the said super cell is created by defining the halftone screens wherein the size of the said super cell can be sufficient to fill said textured screen and no tiling is required.

* * * * *